(12) United States Patent
Stewart et al.

(10) Patent No.: US 9,315,120 B2
(45) Date of Patent: Apr. 19, 2016

(54) COMFORT RECLINE SEAT FOR A VEHICLE

(71) Applicant: AISIN TECHNICAL CENTER OF AMERICA, INC., Northville, MI (US)

(72) Inventors: Patrick Stewart, Taylor, MI (US); Eric Archambeau, South Lyon, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 24 days.

(21) Appl. No.: 14/321,384

(22) Filed: Jul. 1, 2014

(65) Prior Publication Data
US 2016/0001677 A1    Jan. 7, 2016

(51) Int. Cl.
*B60N 2/22* (2006.01)
(52) U.S. Cl.
CPC ........................................ *B60N 2/22* (2013.01)
(58) Field of Classification Search
CPC ......................................................... B60N 2/22
USPC ........................ 297/318, 321, 320, 340, 361.1
See application file for complete search history.

(56) References Cited

U.S. PATENT DOCUMENTS

| | | | |
|---|---|---|---|
| 6,474,737 B1 * | 11/2002 | Canteleux | B60N 2/0292 297/321 X |
| 7,681,945 B1 | 3/2010 | Wiecek et al. | |
| 8,272,694 B2 * | 9/2012 | Hawkins | B60N 2/181 297/318 X |
| 8,313,144 B2 | 11/2012 | Holdampf | |
| 8,376,458 B2 * | 2/2013 | Meister | B64D 11/064 297/318 |
| 2008/0211282 A1 * | 9/2008 | Ventura | B60N 2/22 297/340 |

* cited by examiner

*Primary Examiner* — Anthony D Barfield
(74) *Attorney, Agent, or Firm* — Oblon, McClelland, Maier & Neustadt, L.L.P.

(57) ABSTRACT

A comfort recline seat including a seat back, a seat base, a pivotable connection point, a pivotable base structure, linkages, knuckle connectors may enable a seat base cushion and a seat back cushion to be manipulated to create a range of comfortable seating and bed-like surfaces. The seat may be configured such that the seat base cushion and the seat back cushion may be simultaneously adjusted together to reduce gaps or steps between the seat base cushion and the seat back cushion.

5 Claims, 6 Drawing Sheets

COMFORT RECLINE SEAT FOR A VEHICLE

BACKGROUND OF THE INVENTION

Vehicles such as automobiles, buses, trains, airplanes, boats, etc., may be provided with seats for seating passengers. These seats may include a reclining seat back that is capable of being pivoted to improve comfort of passengers.

DESCRIPTION OF THE RELATED ART

U.S. Pat. No. 7,681,945 describes a wall avoiding convertible ottoman comprising a back-support assembly, a seat-support assembly, a base frame, and a pair of opposed armrests. However, the device of U.S. Pat. No. 7,681,945 cannot be reclined to a significant angle; and the device has low comfort due to lacking cushion material. Moreover, this device is directed toward furniture applications which may not be suitable for a vehicle.

U.S. Pat. No. 8,313,144 describes a stand up and kneel seat including a seat back; a seat cushion; a forward link pivotally extends between the seat cushion and base; a control bracket has a pair of pivotal links forming a four bar connection with the base; and a control link pivotally extends between the seat cushion and control bracket. The device of U.S. Pat. No. 8,313,144 also has a recliner mechanism for selectively pivoting the seat back between a forwardly folded position and a plurality of reclined seating positions. However, the device of U.S. Pat. No. 8,313,144 has a level cushion area only in a vertical position. Furthermore, the device is designed to extend vertically and not create a horizontal bed-like surface.

BRIEF SUMMARY OF THE INVENTION

The present application relates to a comfort recline seat which may be manipulated to create a range of comfortable seating and bed-like surfaces to maximize a user's comfort during use. The comfort recline seat may include a seat back, a seat base, a pivotable connection point, a pivotable base structure, roller bearings, linkages, knuckle connectors, structural braces, and support rods.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE EMBODIMENTS

Figure 1:
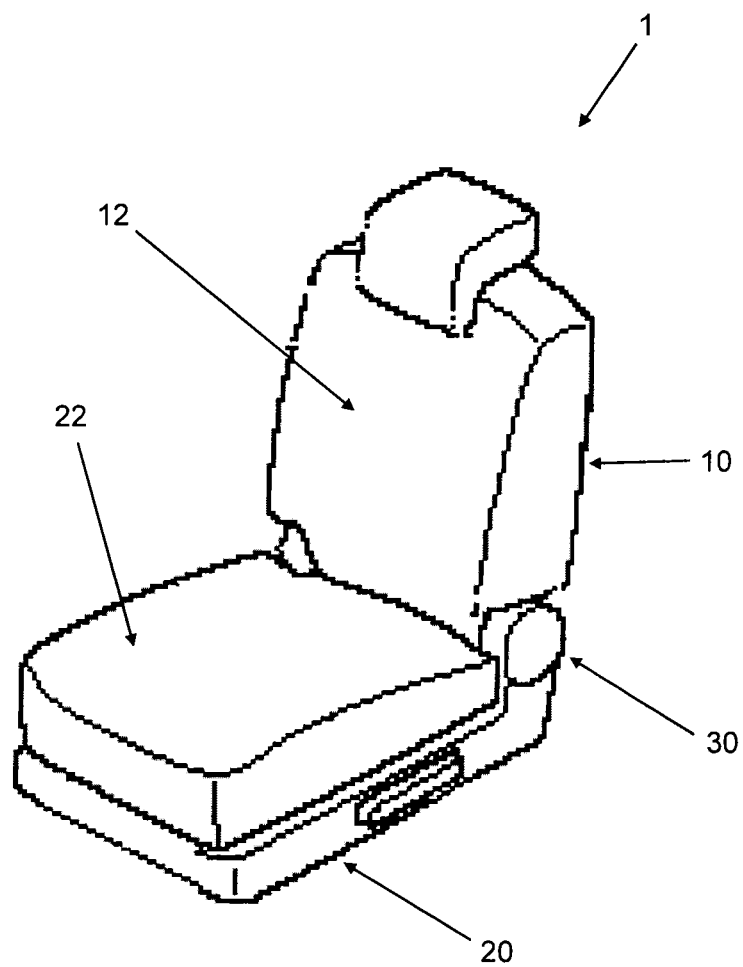
FIG. 1 illustrates an overall isometric view of an external structure of a comfort recline seat in an embodiment of the present disclosure.

Objects, advantages, and features of the exemplary comfort recline seat described herein will be apparent to one skilled in the art from a consideration of this specification, including the attached drawings.

Referring now to the drawings, wherein like reference numerals designate identical or corresponding parts through the several views. Further, as used herein, the words "a," "an" and the like generally carry a meaning of "one or more," unless stated otherwise.

FIGS. 1-6 depict various aspects of a comfort recline seat 1 for a vehicle that may be set at different seating, recline, and collapsed positions. Here a vehicle refers to any mode of transportation including, but not limited to, automobiles, buses, trains, airplanes, and boats. However, the present disclosure is also applicable to seats or furniture used in stationary spaces such as a bedroom or a lounge.

FIG. 1 illustrates a comfort recline seat 1 for a vehicle including a seat back 10, a seat base 20, and a pivotable connection point 30 located between the seat back 10 and seat base 20. The pivotable connection point 30 may connect a lower portion of the seat back 10 to a rear portion of the seat base 20. The seat back 10 may include a seat back cushion 12, and the seat base 20 may include a seat base cushion 22. The seat back cushion 12 and the seat base cushion 22 may be covered with appropriate upholstery, such as cloth, leather, or a synthetic material, to provide comfort to a user while protecting the seat back cushion 12 and the seat base cushion 22 from wear and tear.

The comfort recline seat 1 may be oriented such that a user seated in the comfort recline seat 1 is facing forward with respect to a forward moving direction of the vehicle. However, the comfort recline seat 1 may also be oriented at an angle with respect to the forward moving direction, perpendicular to the forward moving direction, or oriented facing a rearward direction with respect to the forward moving direction of the vehicle, depending on a layout of a cabin of the vehicle.

Figure 2:
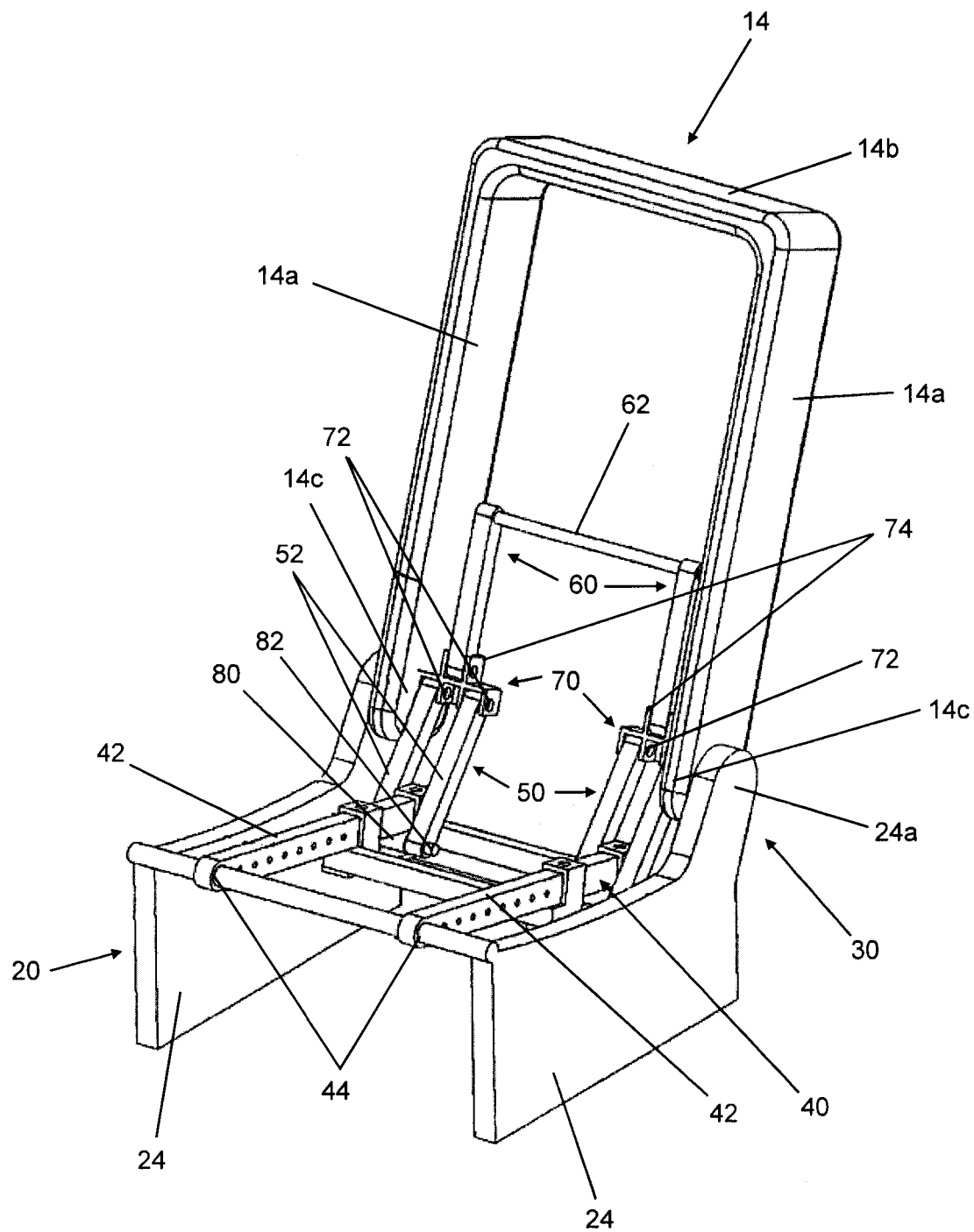
FIG. 2 illustrates an overall isometric view of an internal structure of the comfort recline seat of FIG. 1.

FIG. 2 illustrates an exemplary embodiment of an internal structure of the comfort recline seat 1. The seat back 10 may include a seat back frame structure 14 to support the seat back cushion 12 and to secure the seat back 10 to the seat base 20 via at least the pivotable connection point 30. The seat back frame structure 14 may include at least one vertical member 14a and at least one horizontal member 14b. In select embodiments, the seat back frame structure 14 may be in the form of a U-shaped member including a pair of vertical members 14a and a horizontal member 14b.

The seat base 20 may include at least one vertical support member 24 to support the seat base cushion 22. The at least one vertical support member 24 may be used to secure the seat 1 to a floor or other structural member of the vehicle. Each of the at least one vertical support member 24 may include an extended portion 24a rising upward from the at least vertical support member 24 to connect to the seat back 10 at the pivotable connection point 30. The extended portion 24a of the at least one vertical support member 24 may be secured to an end 14c of the seat back frame structure 14 via the pivotable connection point 30. In select embodiments, the seat base 20 may include two vertical support members 24. The seat base may include a support beam 26 secured to a front side of the two vertical support members 24. The two vertical support members 24 and the support beam 26 may be integrally formed together.

Figure 3:
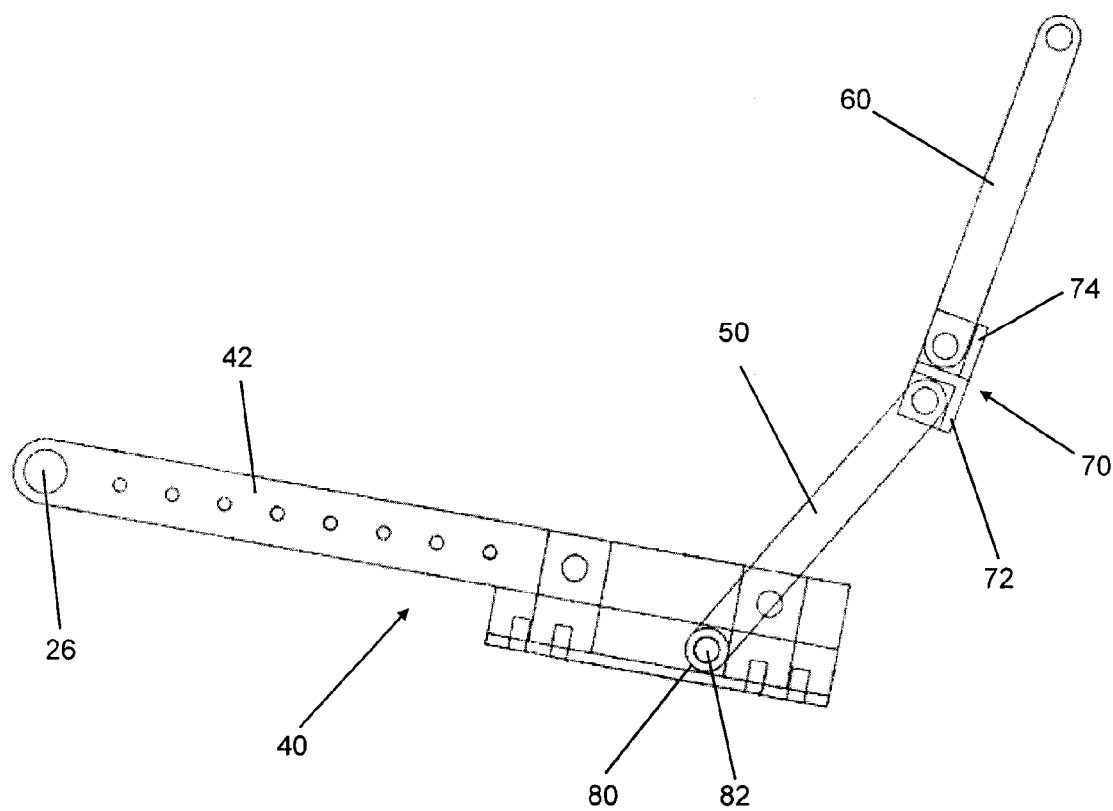
FIG. 3 illustrates a detailed view of a basic structural layout of the internal structure of FIG. 2.

Referring to FIGS. 2 and 3, the seat base 20 may further include a pivotable base structure having structural braces 40. In addition to the pivotable connection point 30, which may allow the seat back frame structure 14 of the seat back 10 to pivot with respect to seat base 20, the structural braces 40 may allow for the seat base cushion 22 to be rotated with respect to the seat base 20. The structural braces 40 may include a pair of support rods 42, and a front end of the support rods 42 may be pivotably secured to the support beam 26 of the seat base 20 via pivots 44. The pivots 44 may include a bushing or bearing to provide quiet operation and smooth rotation of the pivotable base structure having structural braces 40. A center point of the pivots 44 may be aligned along a longitudinal axis of a respective support rod of the pair of support rods 42. The seat base cushion 22 may be mounted onto the support rods 42 to enable a rear end 22b of the seat base cushion 22 to rotated upwards or downwards with respect to the support beam 26.

The seat back frame structure 14 may include a pair of mounting brackets 70 disposed on an interior side of the seat back frame structure 14. The mounting brackets 70 may be in the form of knuckle connectors. The mounting brackets 70 may be disposed on an interior side of the seat back frame structure 14, opposite of the pivotable connection point 30 such that the seat back frame structure 14 is sandwiched between the mounting brackets 70 and the extended portion 24a of the vertical support members 22.

A first set of linkages 50 may be pivotably mounted to a rear end of each of the support rods 42 and to a bottom portion of each of the mounting brackets 70. The mounting brackets 70 may include at least two receiving portions 72 to rotatably secure a first end of two separate linkages 52 of the first set of linkages 50. The support rods 42 may include a set of roller bearings 80 mounted to a bottom surface of the support rods 42, and a second end of the first set of linkages 50 may be mounted to the roller bearings 80 via a rotatable support shaft 82. The rotatable support shaft 82 may extend through both sides of the roller bearings 80 in order to receive the second end of the two separate linkages 52 of the first set of linkages 50. In an assembled form, a linkage 52 of the first set of linkages 50 may be disposed on either side of each of the support rods 42.

A second set of linkages 60 may be pivotably mounted at a first end to a top receiving portion 74 of the mounting brackets 70. A second end of the second set of linkages 60 may be attached to a seat back beam 62 to enable the seat back 10 to be further pivoted during a collapsed position, as will be discussed in detail below.

As shown in FIGS. 2 and 3, the support beam 26 is fixed to the vertical support members 24 of the seat base 20. In operation when the structural braces 40 are rotated such that a rear end 22b of the seat base cushion 22 is rotated upward or downward, the first set of linkages 50 may correspondingly be actuated to lower or raise a lower end 12b of the seat back cushion 12 while also rotating an upper end 12a of the seat back cushion 12 backward or forward. A front end 22a of the seat base cushion 22 may remain at substantially the same height while being rotating about the support beam 26. To adjust a position of the seat back cushion 12 and the seat base cushion 22, one or more of a pneumatic drive system, a mechanical drive system, an electromechanical drive system, and a hydraulic system may be provided to actuate the first set of linkages 50 and/or the second set of linkages 60.

The structural braces 40, the first set of linkages 50, and/or the second set of linkages 60 may each be disposed between the seat back frame structure 14 and the vertical support members 24, with respect to a lateral direction of the seat 1, in order to provide a compact assembly and to prevent interference with other components of the comfort recline seat 1. The internal arrangement of the structural braces 40, the first set of linkages 50, and the second set of linkages 60 may promote comfort and safety by preventing the above components from protruding out of the seat back 10 and/or the seat base 20.

Figure 4:
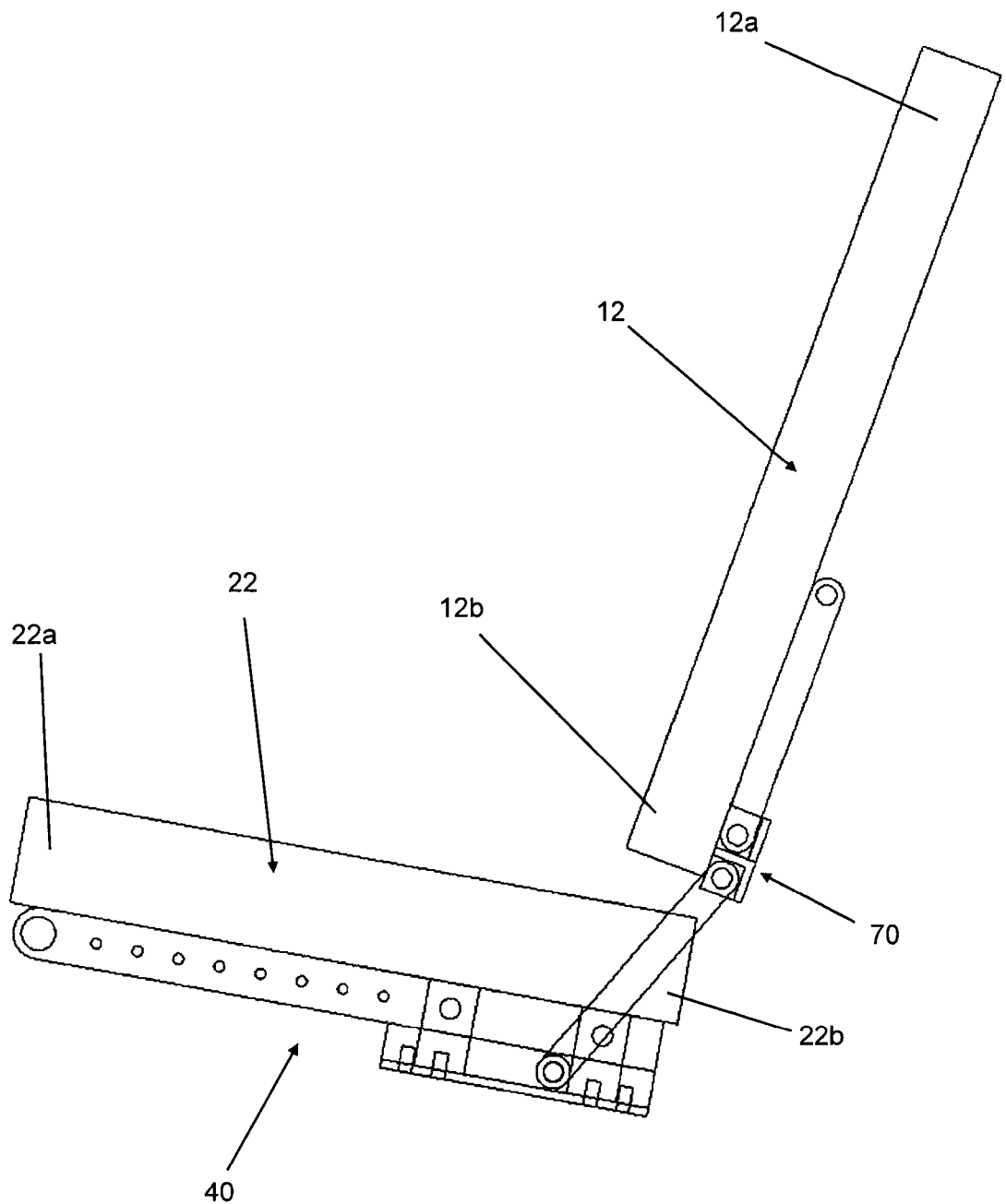
FIG. 4 illustrates a side view of internal structure of the comfort recline seat, positioned in a seating position, in an embodiment of the present disclosure.
Figure 5:
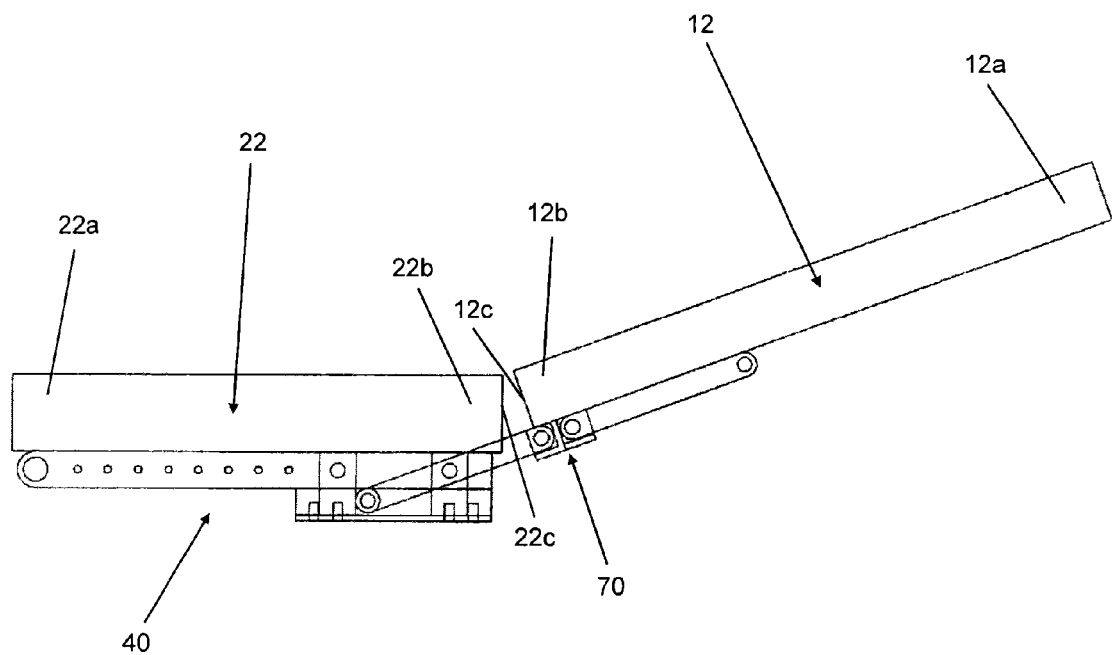
FIG. 5 illustrates a side view of internal structure of the comfort recline seat, positioned in a reclined position, in an embodiment of the present disclosure.
Figure 6:
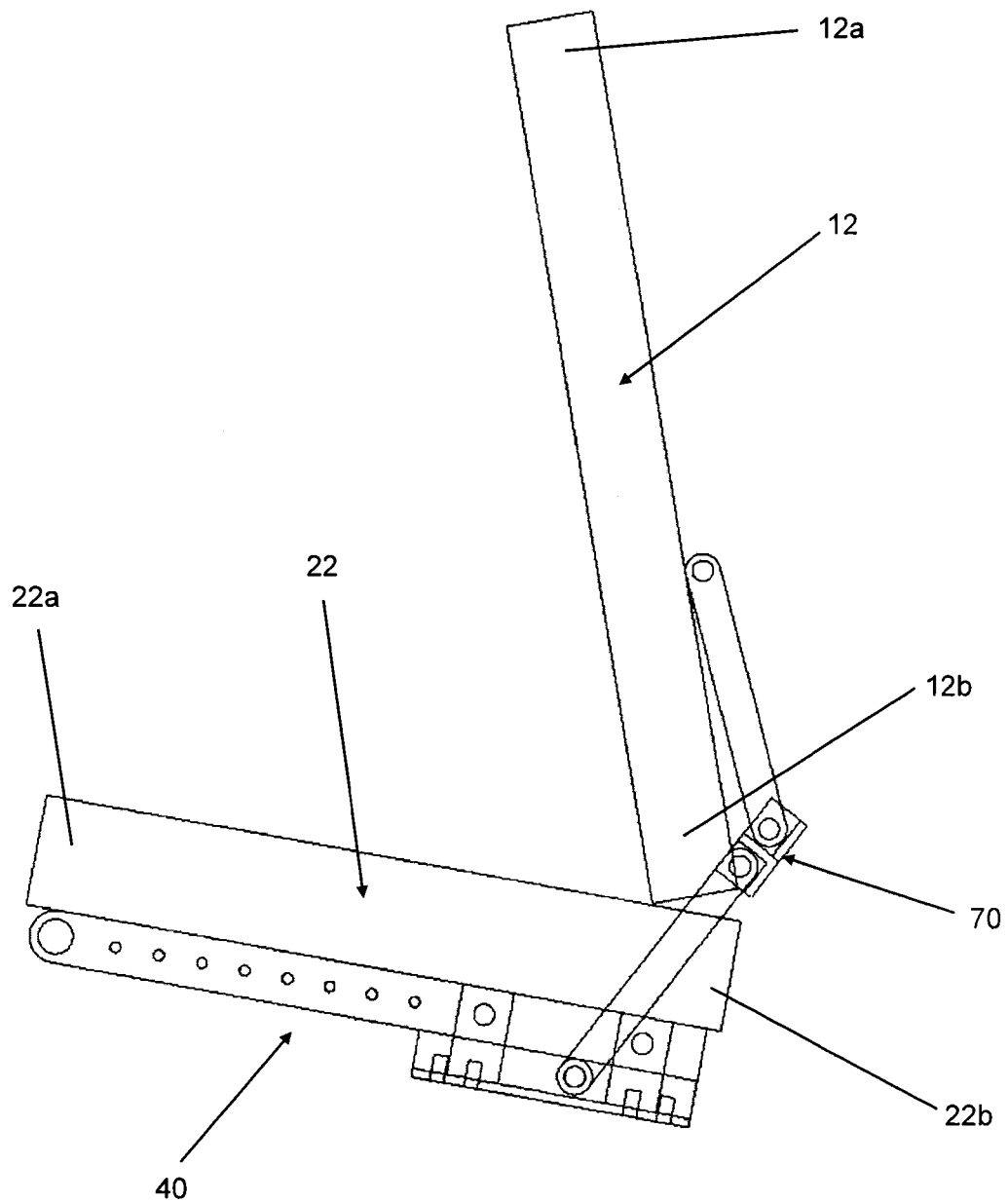
FIG. 6 illustrates a side view of internal structure of the comfort recline seat, positioned in a collapsed position, in an embodiment of the present disclosure.

Referring to FIGS. 4-6, three exemplary positions of the comfort recline seat 1 are shown. However, the comfort recline seat 1 is not limited to the exemplary positions, but may also be adjusted and set at positions intermediate of those shown in FIGS. 4-6. In select embodiments, the comfort recline seat 1 may be adjusted such that the seat back cushion 12 and the seat base cushion 22 are parallel or substantially parallel with one another.

FIG. 4 illustrates an exemplary sitting position of the comfort recline seat 1. In the sitting position, the seat base cushion 22 may be sloped downward towards a rear of the comfort recline seat 1 at a shallow angle, while the seat back cushion 12 may be sloped upward and towards a rearward direction of the comfort recline seat 1 at a steep angle.

FIG. 5 illustrates an exemplary reclined position of the comfort recline seat 1. In the reclined position, the rear end 22b of the seat base cushion 22 is rotated upward, while the upper end 12a of the seat back cushion 12 is rotated downward and away from the seat base cushion 22, in comparison with with the sitting position shown in FIG. 4. In the reclined position, both the seat back cushion 12 and the seat base cushion 22 are substantially horizontal. The seat back cushion 12 and the seat base cushion 22 may be positioned and set such that a plane formed by the seat back cushion 12 and a plane formed by the seat base cushion 22 are rotated to a minimal angle. In select embodiments, the seat back cushion 12 and the seat base cushion 22 may be positioned to be parallel with each other.

FIG. 6 illustrates an exemplary collapsed position of the comfort recline seat 1. In the collapsed position, the rear end 22b of the seat base cushion 22 may be rotated downward, while the bottom end 12b of the seat back cushion 12 may be shifted forward, and the upper end 12a of the seat back cushion 12 may be rotated forward toward a front end of the comfort recline seat 1. In the collapsed position, an overall amount of space taken up by the comfort recline seat 1 is reduced. For example, a front to rear footprint of the comfort recline seat 1 is reduced in the collapsed position, in comparison with the sitting position or reclined position, to provide additional space within a cabin of a vehicle.

Referring to FIGS. 3-6, operation of the comfort recline seat 1 will now be described. The connection and arrangement of the support rods 42 and the first set of linkages 50, as described above, enables the seat back cushion 12 and the seat base cushion 22 to be pivoted and repositioned together at the same time for optimal alignment, thereby simplifying operation and improving overall ergonomics and user comfort.

Starting from the sitting position, as shown in FIG. 4, the seat base cushion 22 may be rotated counter-clockwise such that the rear end 22b of the seat base cushion 22 is raised upward. As the seat base cushion 22 is rotated, the first set of linkages 50 may be correspondingly rotated clockwise, which may cause the bottom end 12b of the seat back cushion 12 to be lowered and the upper end 12a of the seat back cushion 12 to be rotated clockwise downward.

When the comfort recline seat 1 is actuated to a first extreme position based on the above movements, the exemplary reclined position of FIG. 5 is achieved. In the reclined position, an edge 22c of the rear end 22b of the seat base cushion 22, and an edge 12c of the bottom end 12b of the seat back cushion 12 may be substantially aligned to avoid significant gaps or a step from being formed between the seat base cushion 22 and the seat back cushion 12, thereby reducing or eliminating pressure points and improving user comfort.

The support shaft 82 and the roller bearings 80 are arranged in a slot below the support rods 42 as shown in FIGS. 3-5. Shown in FIG. 4, the roller bearing 80 is in a rightmost (rearmost) position of the slot when the comfort recline seat 1 is in the sitting position. When the comfort recline seat 1 is actuated to the first extreme position as shown in FIG. 5, the roller bearing 80 is in a leftmost (frontmost) position of the slot. When the roller bearing 80 contacts either of the leftmost or rightmost positions of the slot, the rotation of the seat 1 is stopped. Therefore, the ends of the slot, in which the roller bearings 80 are mounted, define the maximum stop points which prevent the comfort recline seat 1 from reclining beyond a predetermined point. However, the system can be locked by other means at other, intermediary, points based on a drive system selection.

Starting again from the sitting position, as shown in FIG. 4, the seat base cushion 22 may be rotated clockwise such that the rear end 22b of the seat base cushion 22 is lowered downward. As the seat base cushion 22 is rotated, the first set of linkages 50 may correspondingly be rotated counter-clockwise, and the second set of linkages 60 may be rotated counter-clockwise. The rotations of the first set of linkages 50 and/or the second set of linkages 60 may cause the upper end 12a of the seat back cushion 12 to rotate and shift forward in a counter-clockwise direction, and may cause the lower end 12b of the seat back cushion 12 to rotate and shift rearward in a counter-clockwise direction.

When the comfort recline seat 1 is actuated to a second extreme position based on the above movements, the exemplary collapsed position of FIG. 6 is achieved. In the collapsed position, an overall front to rear footprint of the comfort recline seat 1 is minimized, in comparison with the sitting position and the relined position, thereby providing additional cabin space for use.

While operation of the comfort recline seat 1 discussed above details operation starting from the sitting position, it should be noted that adjustment toward the reclined position or toward the collapsed position would operate in a similar manner regardless of what intermediate position the seat 1 is currently set to.

It is understood that the comfort recline seat for vehicle in the present disclosure is not limited to the particular embodiments disclosed herein, but embraces much modified forms thereof that are within the scope of the following claims.

The invention claimed is:

1. A comfort recline seat including a seat base and a seat back, comprising:
    a seat back frame structure to support a seat back cushion;
    a pivotable base structure including a set of support rods to support a seat base cushion, the set of support rods each including a slot arranged in a length direction of the respective support rods;
    a first set of linkages pivotably connected to the seat back frame structure and pivotably connected to the pivotable base structure by at least one roller bearing in the respective slot; and
    a support beam extending across a front portion of the seat base,
    wherein the support rods are rotatably supported on the support beam to enable a rear end of the seat base cushion to be rotated upward or downward,
    wherein the first set of linkages actuate the seat back frame to rotate forward or backward in response to the pivotable base being rotated upward or downward, and
    wherein the roller bearings are slidable in the slot and ends of the slot limit a maximum forward and a maximum rearward motion of the seat back frame.

2. The comfort recline seat according to claim 1,
    wherein the seat back frame includes at least one mounting bracket pivotally mounted to a first end of the first set of linkages, and
    wherein a rear end of the support rods are pivotably mounted to a second end of the first set of linkages by a support shaft extending through at least one of the set of roller bearings.

3. The comfort recline seat according to claim 2, wherein the support rods have a front end pivotally secured to the support beam of the seat base.

4. The comfort recline seat according to claim 2,
    wherein the first set of linkages includes two linkages, and
    wherein a linkage of the two linkages is mounted on opposite sides of the rear end of one of the support rods such that the one support rod is sandwiched between the two linkages.

5. The comfort recline seat according to claim 2, wherein the at least one mounting bracket is a knuckle connector.

* * * * *